(12) United States Patent
Berlin et al.

(10) Patent No.: US 10,807,286 B2
(45) Date of Patent: Oct. 20, 2020

(54) LIQUID INJECTION MOLDING APPARATUS

(71) Applicant: Mold-Masters (2007) Limited, Georgetown (CA)

(72) Inventors: Alexander Berlin, Mississauga (CA); Martin Kestle, Everett (CA)

(73) Assignee: MOLD-MASTERS (2007) LIMITED, Georgetown (CA)

( * ) Notice: Subject to any disclaimer, the term of this patent is extended or adjusted under 35 U.S.C. 154(b) by 341 days.

(21) Appl. No.: 15/481,171

(22) Filed: Apr. 6, 2017

(65) Prior Publication Data
US 2018/0290359 A1   Oct. 11, 2018

(51) Int. Cl.
| | | |
|---|---|---|
| *B29C 45/17* | (2006.01) | |
| *B29C 45/03* | (2006.01) | |
| *B29C 45/18* | (2006.01) | |
| *B29C 45/67* | (2006.01) | |
| *B29C 45/47* | (2006.01) | |
| *B29K 105/00* | (2006.01) | |

(52) U.S. Cl.
CPC .......... *B29C 45/1775* (2013.01); *B29C 45/03* (2013.01); *B29C 45/18* (2013.01); *B29C 45/6707* (2013.01); *B29C 45/47* (2013.01); *B29K 2105/0058* (2013.01)

(58) Field of Classification Search
CPC ..... B29C 45/1775; B29C 45/03; B29C 45/18; B29C 45/6707; B29C 45/47; B29K 2105/0058
See application file for complete search history.

(56) References Cited

U.S. PATENT DOCUMENTS

| | | | |
|---|---|---|---|
| 5,233,912 A | 8/1993 | Mueller | |
| 6,126,359 A | 10/2000 | Dittrich et al. | |
| 7,081,081 B2 | 7/2006 | Schütz et al. | |
| 2002/0026995 A1* | 3/2002 | Kono | B22D 17/007 164/113 |

FOREIGN PATENT DOCUMENTS

GB    1 023 689 A    3/1966

OTHER PUBLICATIONS

International Search Report dated May 7, 2018 in corresponding International Patent Application No. PCT/CA2018/050388.
Written Opinion dated May 7, 2018 in corresponding International Patent Application No. PCT/CA2018/050388.

* cited by examiner

*Primary Examiner* — Michael M. Robinson
(74) *Attorney, Agent, or Firm* — Medler Ferro Woodhouse & Mills PLLC (57) ABSTRACT

A liquid injection molding apparatus is provided. The liquid injection molding apparatus comprises a mold assembly; a clamping unit; an injector including a barrel; a feed screw concentrically located in the barrel; and a motor having a drive shaft removably coupled to the feed screw via a bayonet connector.

15 Claims, 13 Drawing Sheets

LIQUID INJECTION MOLDING APPARATUS

FIELD

The invention relates generally to a liquid injection molding apparatus and, in particular, to a liquid injection molding apparatus having a feed screw that can be quickly coupled to and decoupled from a drive shaft.

BACKGROUND

Liquid injection molding injects a moldable liquid into a mold to form a solid article. The moldable liquid is a mixture such as thermosets or liquid silicone rubber (LSR) that is in the liquid state at room temperature and when heated cures into a solid. Some mixtures can also cure at room temperature if left at room temperature over a period of time.

The barrel of a liquid injection molding apparatus may require frequent cleaning. Reducing the time the liquid injection molding apparatus is offline for cleaning is desirable.

BRIEF SUMMARY

In an illustrated embodiment, a liquid injection molding apparatus is provided. The liquid injection molding apparatus comprises a mold assembly; a clamping unit; an injector including a barrel; a feed screw concentrically located in the barrel; and a motor having a drive shaft removably coupled to the feed screw via a bayonet connector.

The bayonet connector can include a receiver, and an insert including a first end, and a second end distal from the first end. The first end removably coupled to and housed in the receiver. The second end coupled to the feed screw. The drive shaft including a hollow portion having a non-round cross-section. The receiver shaped for a snug fit and housed in the hollow portion such that rotating the drive shaft about an axis of the drive shaft rotates the receiver.

The receiver can include an axial opening, and a wall including an interior surface defining a cylindrical space connected to the axial opening. The wall including at least one lug projecting from the interior surface into the cylindrical space, distal from the axial opening. The insert including an exterior surface and at least one slot on the exterior surface at the first end. The at least one slot having an axial leg and a circumferential leg. The circumferential leg forming an acute angle with the axial leg at a junction. The axial leg including a third end distal from the junction. The third end including an axial opening to permit the at least one lug to enter the at least one slot when the third end engages the at least one lug. The circumferential leg including a fourth end distal from the junction such that rotating the receiver about an axis of the receiver in an angular direction to seat the at least one lug in the fourth end rotates the insert.

The receiver can include an axial opening, and a wall including an interior surface defining a cylindrical space connected to the axial opening. The insert including an exterior surface having at least one lug, at the first end, projecting radially away from the exterior surface. The interior surface including at least one slot having an axial leg and a circumferential leg. The circumferential leg forming an acute angle with the axial leg at a junction. The axial leg including a third end distal from the junction. The third end including an axial opening to permit the at least one lug to enter the at least one slot when the third end engages the at least one lug. The circumferential leg including a fourth end distal from the junction such that rotating the receiver about an axis of the receiver in an angular direction to seat the at least one lug in the fourth end rotates the insert.

The liquid injection molding apparatus can further comprise a collet. The drive shaft including an axial opening connected to the hollow portion. The collet threadably connected to axial opening of the drive shaft to inhibit axial displacement of the receiver within the hollow portion thereby inhibiting the at least one lug from moving away from the fourth end.

The receiver can include another axial opening, distal from the axial opening of the receiver, connected to the cylindrical space. The first end of the insert extends through the receiver passing through both axial openings of the receiver.

The at least one lug can include more than one lug and the at least one slot can include more than one slot, each slot engaging a respective one of the more than one lug.

The insert can be threadably connected to the feed screw.

The exterior surface of the insert can include two radially spaced apart planar portions.

The wall of the receiver can include an exterior surface including four planar sides and four chamfers. Each chamfer connecting two interconnected planar sides of the four planar sides. The at least one lug can include four lugs and the at least one slot can include four slots. Each lug located at a respective chamfer.

The receiver can include an exterior surface including four planar sides and four chamfers. Each chamfer connecting two interconnected planar sides of the four planar sides. The at least one lug include four lugs and the at least one slot can include four slots. Each axial leg of the slots located at a respective chamfer.

The at least one slot can extend from the interior surface of the receiver completely to the exterior surface of receiver.

The hollow portion can have a rounded rectangular cross-section.

The hollow portion can have a hexagonal cross-section.
The hollow portion can have an octagonal cross-section.
The hollow portion can have a D-shaped cross-section.

DETAILED DESCRIPTION

Specific embodiments of the present application are now described with reference to the figures. The following detailed description is merely exemplary in nature and is not intended to limit the concepts and uses of the concepts. Furthermore, there is no intention to be restricted by any expressed or implied theory in the present disclosure. In the description, "downstream" is used with reference to the direction of the moldable liquid flow from an injector to a mold cavity, and also with reference to the order of components, or features thereof, through which the mold material flows from the injector to the mold cavity, whereas "upstream" is used with reference to the opposite direction.

Figure 1:
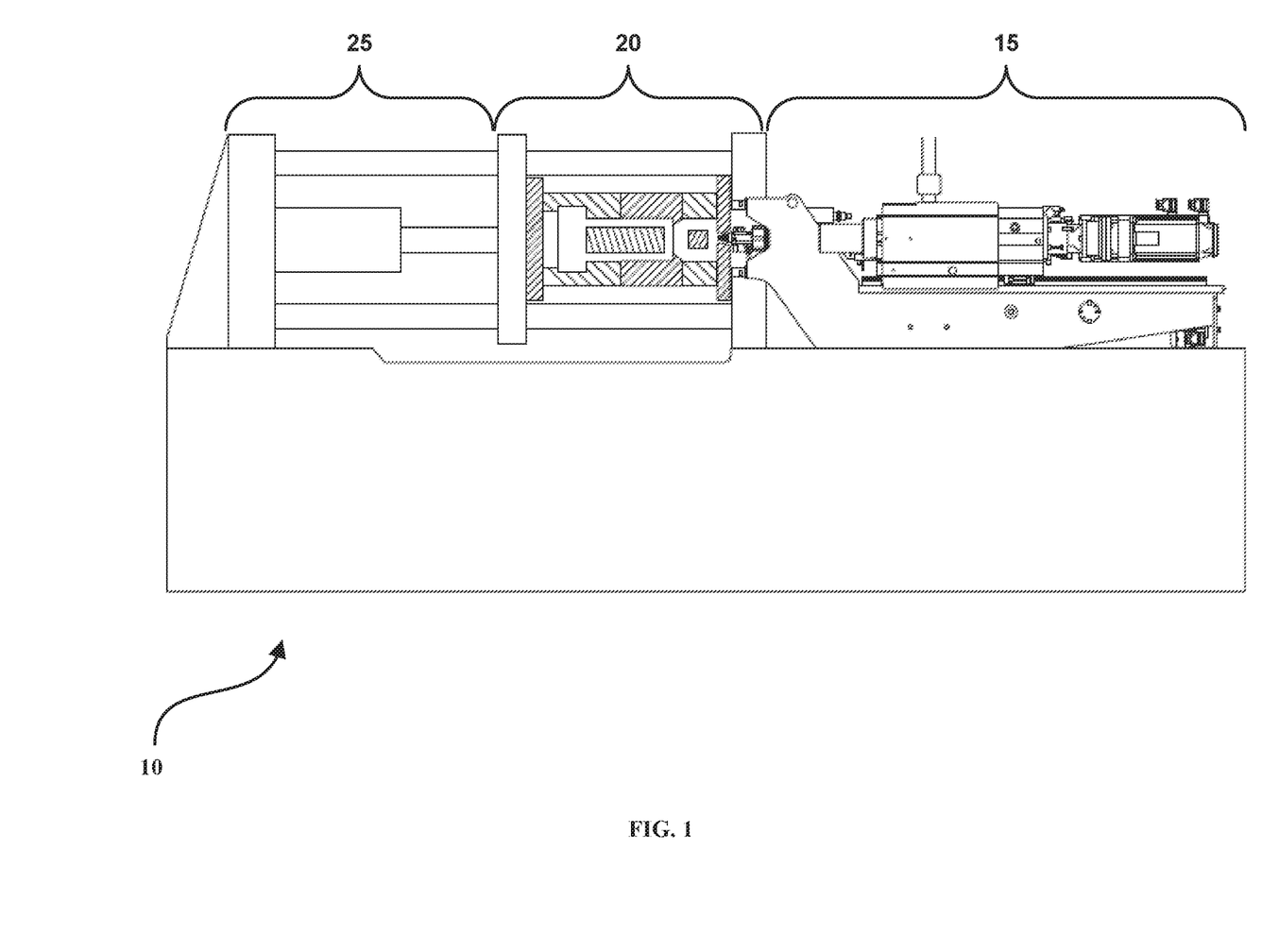
FIG. 1 is a schematic view of a liquid injection molding apparatus according to an embodiment of the present application.

FIG. 1 is a schematic view of a liquid injection molding apparatus 10 including an injector 15, a mold assembly 20, and a clamping unit 25. In operation, after clamping unit 25 clamps mold assembly 20 shut, injector 15 injects a moldable liquid (not shown) into mold assembly 20. After the moldable liquid cures into a solid article (not shown), clamping unit 25 opens mold assembly 20 to release the newly formed solid article. The process is subsequently repeated to create the next solid article.

Figure 2:
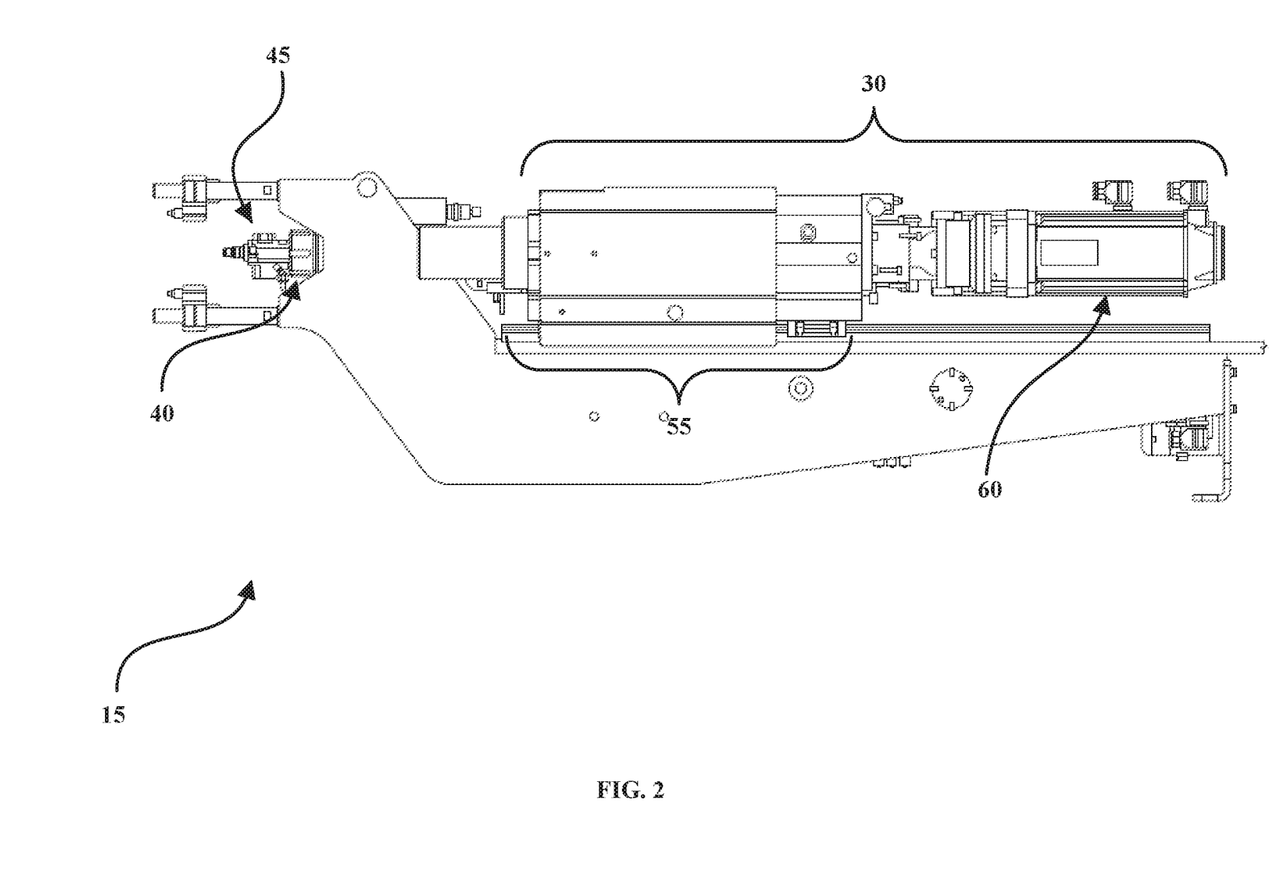
FIG. 2 is a side view of an injector of FIG. 1 according to an embodiment of the present application.
Figure 3:
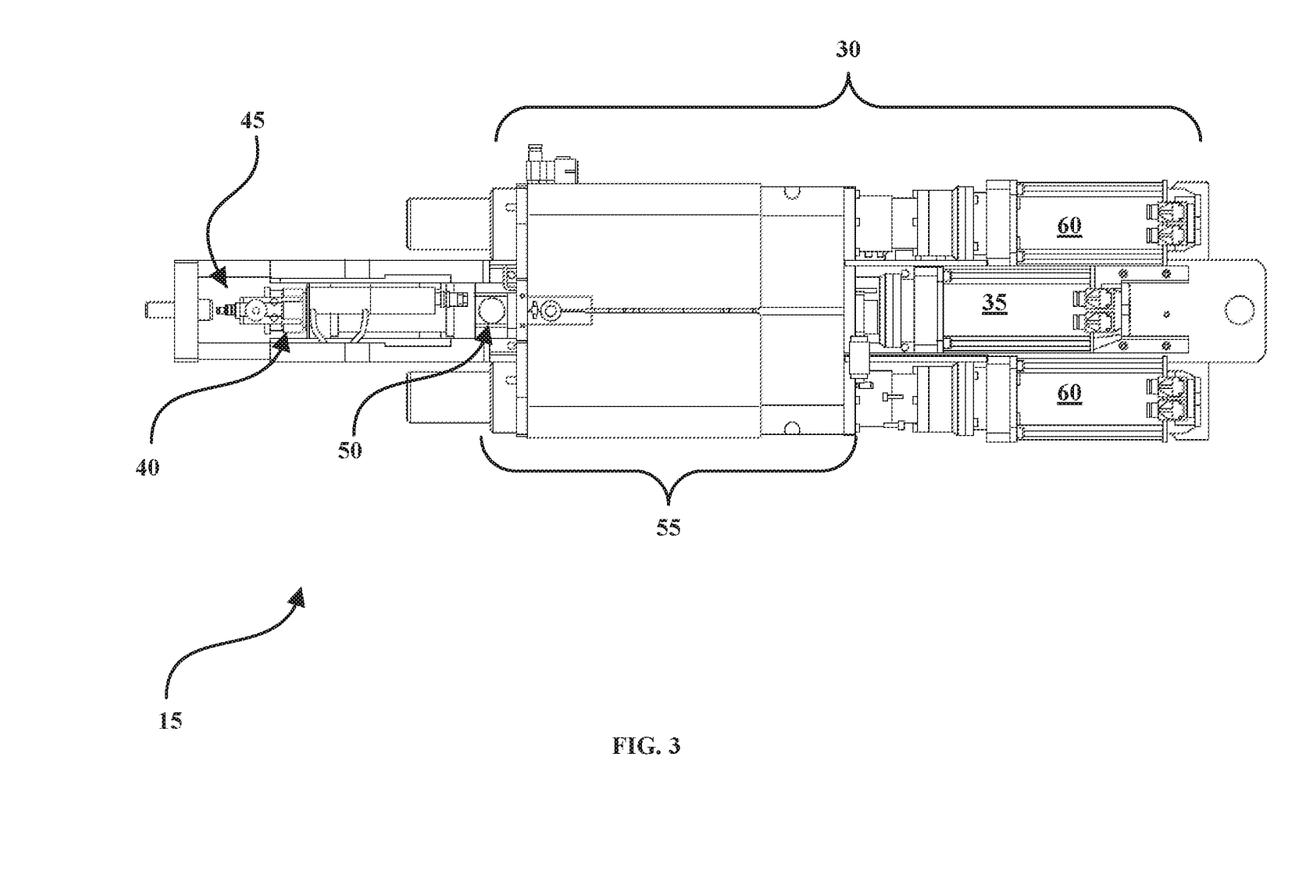
FIG. 3 is a top view of the injector of FIG. 2.

FIG. 2 and FIG. 3 illustrate an embodiment of injector 15, which includes a linear actuator 30 and a feed screw motor 35, both coupled to a feed screw 37 (see FIG. 4 for a magnified view of feed screw 37 removably coupled to feed screw motor 35), and concentrically located in a barrel 40, for reciprocating and rotating, respectively, feed screw 37 within barrel 40. Injector 15 includes a nozzle 45 and an input valve 50, nozzle 45 for controlling the moldable liquid dispensed from injector 15 into mold assembly 20 and input valve 50 for receiving the moldable liquid from a source (not shown) into barrel 40. Linear actuator 30 includes a drive mechanism 55 and at least one motor 60. Drive mechanism 55 is coupled to motor 60 and feed screw 37 to convert the rotational motion of motor 60 into a linear motion, which is imparted onto feed screw 37 to reciprocate feed screw 37 within barrel 40. Linear actuator 30 moves feed screw 37 downstream to inject the moldable liquid into mold assembly 20 through nozzle 45 and retracts feed screw 37 upstream to reload feed screw 37 with the moldable liquid for the subsequent injection. (Depending on the application of injector 15, one or two motor 60 may be used and feed screw motor 35 may be used to rotate feed screw 37 to stir the moldable liquid within barrel 40.)

Figure 4:
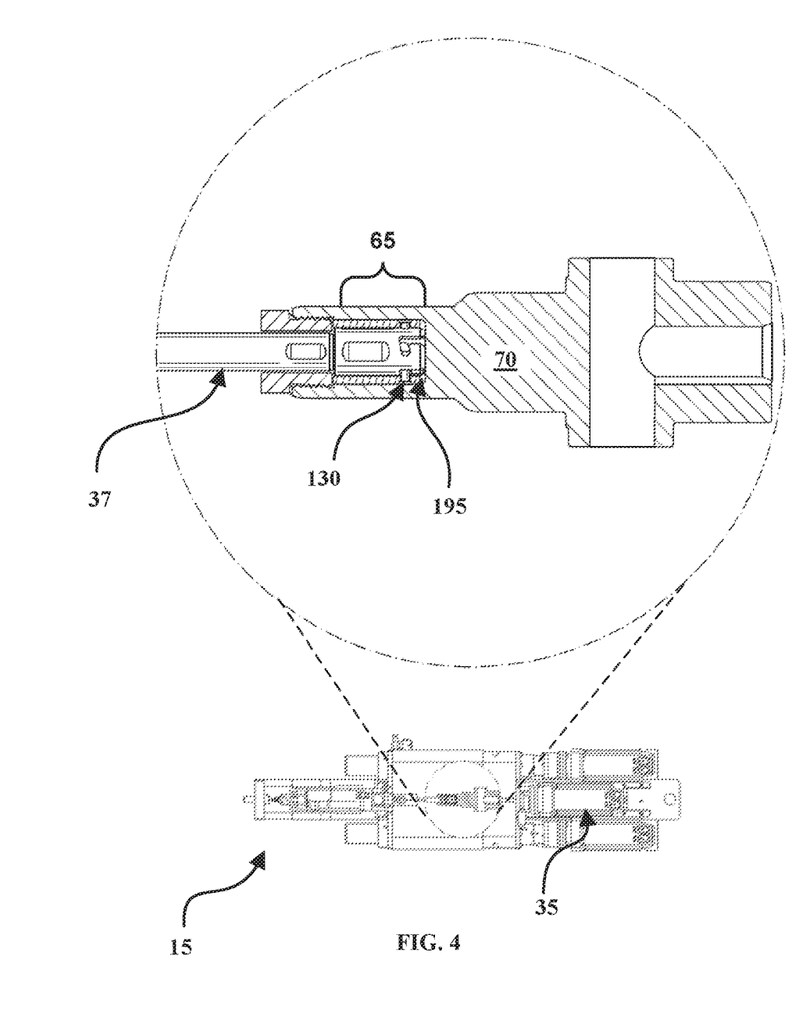
FIG. 4 is a top partially cutaway view of the injector of FIG. 2 showing a magnified view of the bayonet connector removably coupling the feed screw to the drive shaft of the feed screw motor, according to an embodiment of the present application.

Depending on the application of the liquid injection molding apparatus 10, injector 15 may require frequent cleaning of feed screw 37 necessitating the removal of feed screw 37 from feed screw motor 35. FIG. 4 illustrates an embodiment of injector 15 including a bayonet connector 65 removably coupling a drive shaft 70 of feed screw motor 35 to feed screw 37.

Figure 5:
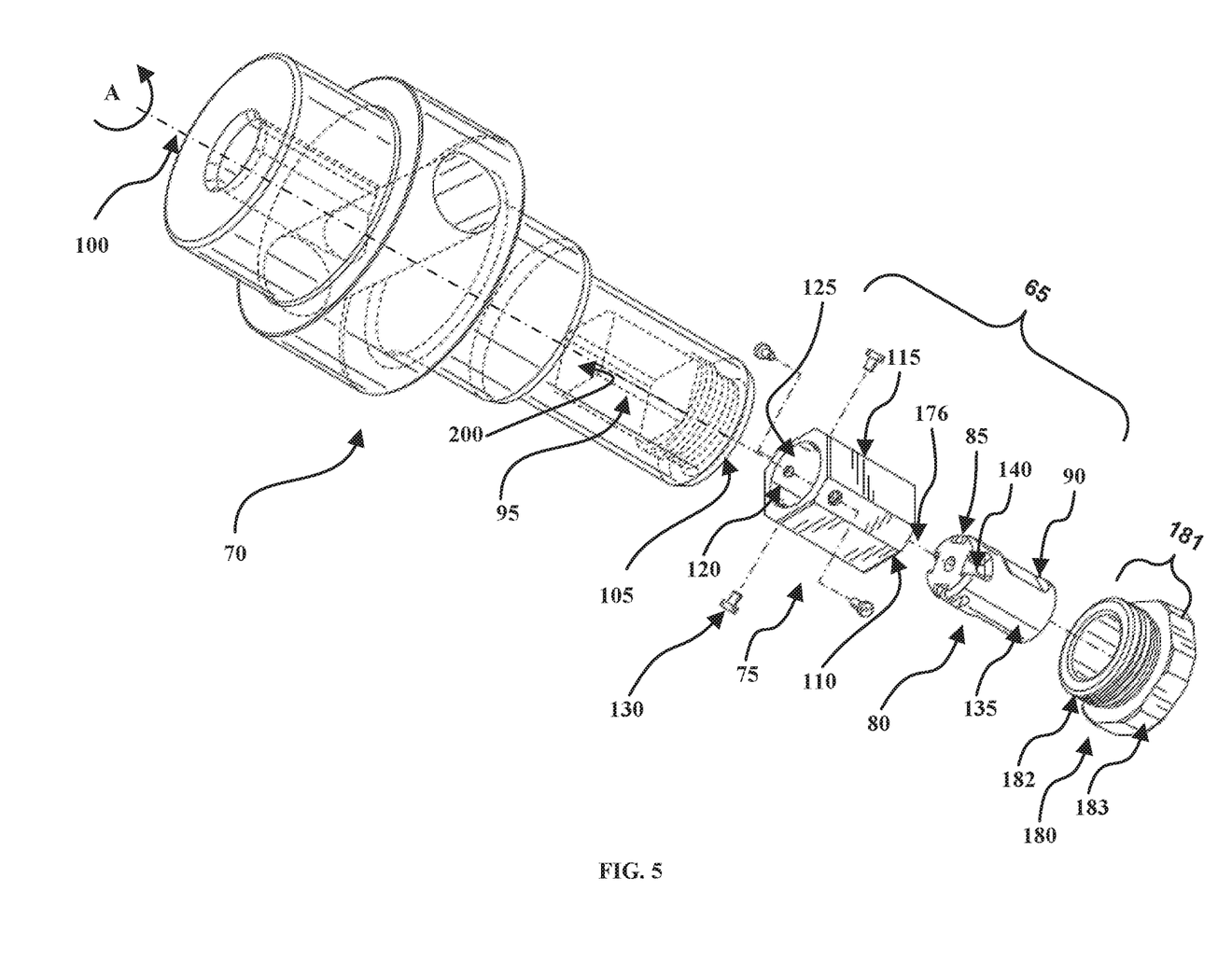
FIG. 5 is an exploded perspective view of the bayonet connector of FIG. 4 with its associated components.
Figure 10:
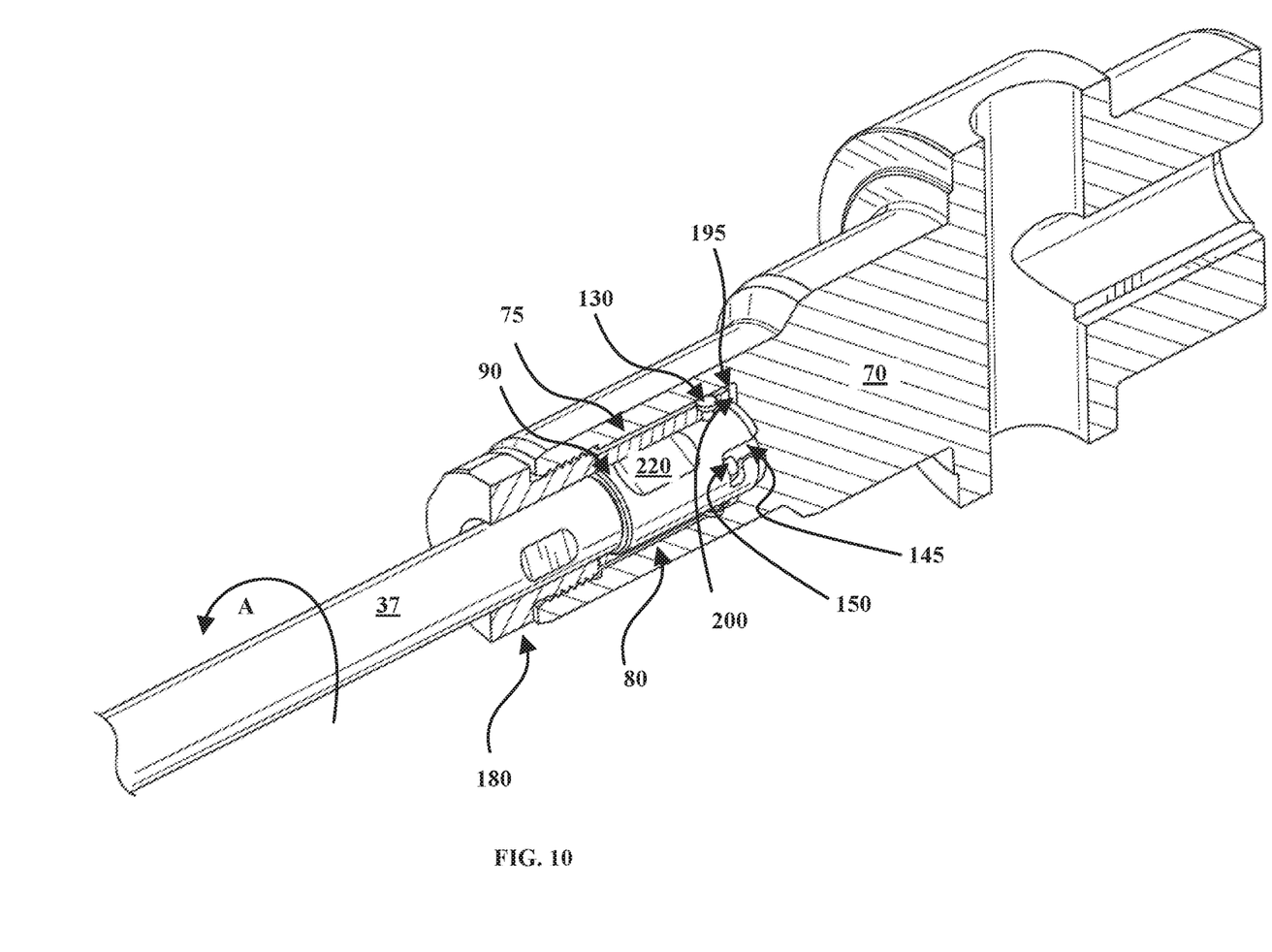
FIG. 10 is a perspective partial sectioned view of the feed screw coupled to the drive shaft of the feed screw motor by the bayonet connector of FIG. 4.

Referring to FIG. 4 and FIG. 5, bayonet connector 65 includes a receiver 75 and an insert 80 including a first end 85 and a second end 90 distal from first end 85, first end 85 is removably coupled to and housed in receiver 75, second end 90 is coupled to feed screw 37 (see FIG. 10). Drive shaft 70 defines a hollow portion 95 having a non-round cross-section. Receiver 75 is shaped for a snug fit and housed in hollow portion 95 such that rotating drive shaft 70 about an axis 100 of drive shaft 70 rotates receiver 75 about axis 100. Insert 80 can be threadably connected to feed screw 37 but a person of ordinary relevant skills in the art would appreciate that other means of connection (e.g., welding, insert 80 formed integral with feed screw 37, etc. . . . ) are possible.

Receiver 75 includes an axial opening 110, and a wall 115 having an interior surface 120 defining a cylindrical space 125 connected to axial opening 110 (see FIG. 5). In the embodiment illustrated by FIG. 4 and FIG. 5, wall 115 includes at least one lug 130, located distal from axial opening 110, projecting from interior surface 120 into cylindrical space 125 (see FIG. 6 and FIG. 7).

Figure 8:
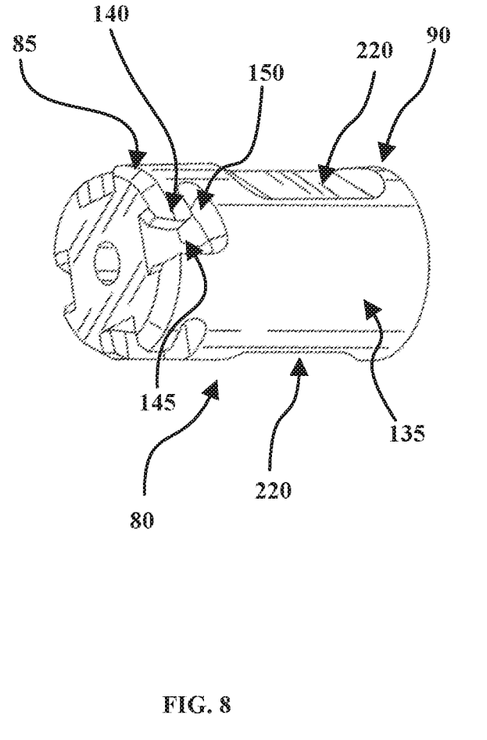
FIG. 8 is a perspective view of the insert of the bayonet connector of FIG. 4.
Figure 9:
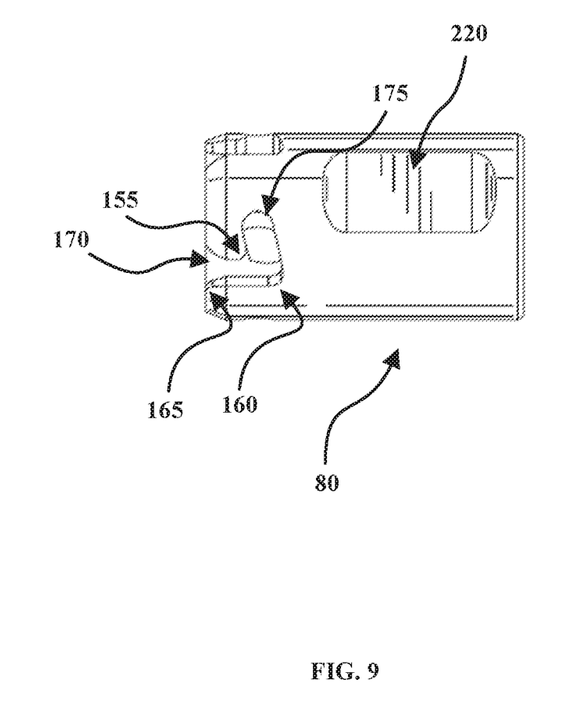
FIG. 9 is a side view of the insert of FIG. 8.

Referring to FIG. 8 and FIG. 9, insert 80 includes an exterior surface 135 and at least one slot 140 on exterior surface 135 at first end 85. Slot 140 has an axial leg 145 and a circumferential leg 150, circumferential leg 150 forming an acute angle 155 with the axial leg 145 at a junction 160. Axial leg 145 includes a third end 165 distal from junction 160. Third end 165 includes an axial opening 170 to permit lug 130 to enter slot 140 when third end 165 engages lug 130. Circumferential leg 150 includes a fourth end 175 distal from junction 160 such that, with lug 130 in fourth end 175, rotating receiver 75 about an axis 176 of receiver 75 in an angular direction A (see FIG. 5) rotates insert 80 (see FIG. 10).

Referring to FIG. 5 and FIG. 10, injector 15 further comprises a collet 180. Drive shaft 70 includes an axial opening 105 connected to hollow portion 95. Collet 180 is threadably connected to axial opening 105 of drive shaft 70 to inhibit axial displacement of receiver 75 within hollow portion 95 thereby inhibiting lug 130 from moving away from the fourth end 175 of circumferential leg 150. In the illustrated embodiment, collet 180 includes a tubular body 181 having an externally threaded end 182 and a flange 183 at an end opposite externally thread end 182 for gripping to connect or disconnect collet 180 to or from drive shaft 70. In the illustrated embodiments, collet 180 is dimensioned to permit feed screw 37 and insert 80 to axially pass through collet 180. However, a person of ordinary relevant skills in the art would appreciate that collet 180 need not allow both feed screw 37 and insert 80 to axially pass through collet 180. It is possible to dimension collet 180 to only allow either feed screw 37 or insert 80, rather than both, to axially pass through collet 180.

Figure 6:
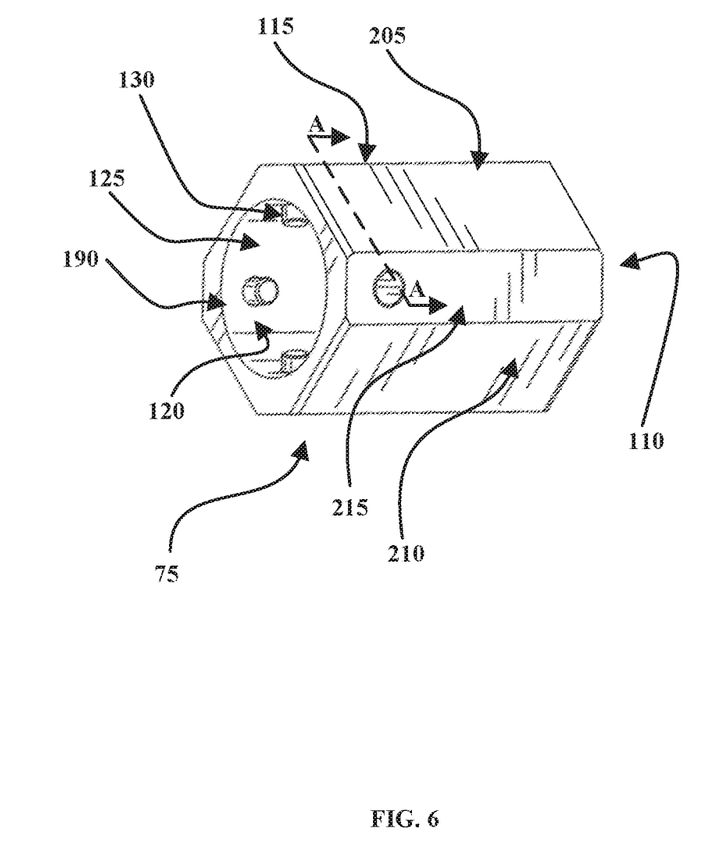
FIG. 6 is a perspective view of the receiver of the bayonet connector of FIG. 4.
Figure 7:
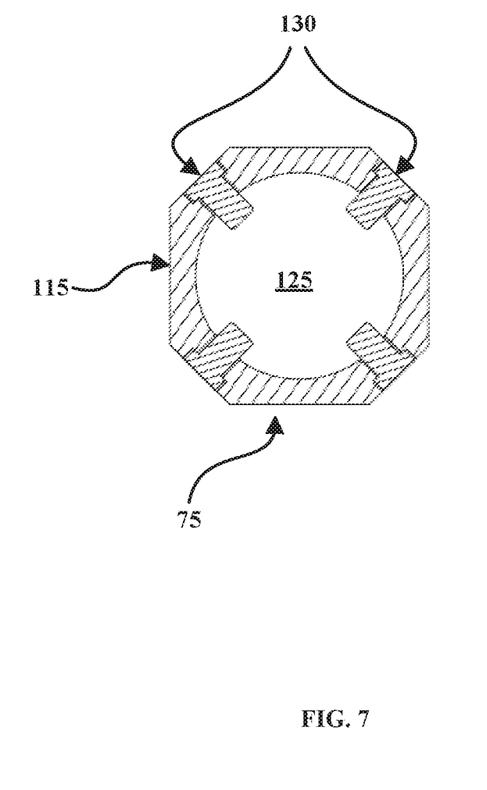
FIG. 7 is a cross-section view of the receiver of FIG. 6 taken along line A-A of FIG. 6.

Receiver 75 includes another axial opening 190, distal from axial opening 110 of receiver 75, and connected to cylindrical space 125 (see FIG. 6). That is, cylindrical space 125 spans both axial openings 110, 190. First end 85 of insert 80 extends through receiver 75 passing through both axial openings 110, 190 of receiver 75. That is, when collet 180 urges receiver 75 towards drive shaft 70 seating lug 130 in fourth end 175 of circumferential leg 150 (i.e., lug 130 abuts fourth end 175), a gap 195 separates receiver 75 from an axial surface 200 of drive shaft 70. Axial surface 200 forms a closed end of hollow portion 95. In the illustrated embodiments, insert 80 abuts axial surface 200 for transmitting an axial force experienced by feed screw 37 to drive shaft 70 (see FIG. 10). And because receiver 75 does not touch axial surface 200, when collet 180 seats lugs 130 in fourth end 175 of slots 140, receiver 75 is inhibited from any axial displacement within hollow portion 95 thereby inhibiting lugs 130 from separating from slots 140.

Wall 115 includes an exterior surface 205 including four planar sides 210 and four chamfers 215, each chamfer 215 connecting two interconnected planar sides 210

In the illustrated embodiments, exterior surface 135 of insert 80 includes two radially spaced apart planar portions 220 to provide a surface for gripping during coupling or decoupling insert 80 from receiver 75.

Figure 11:
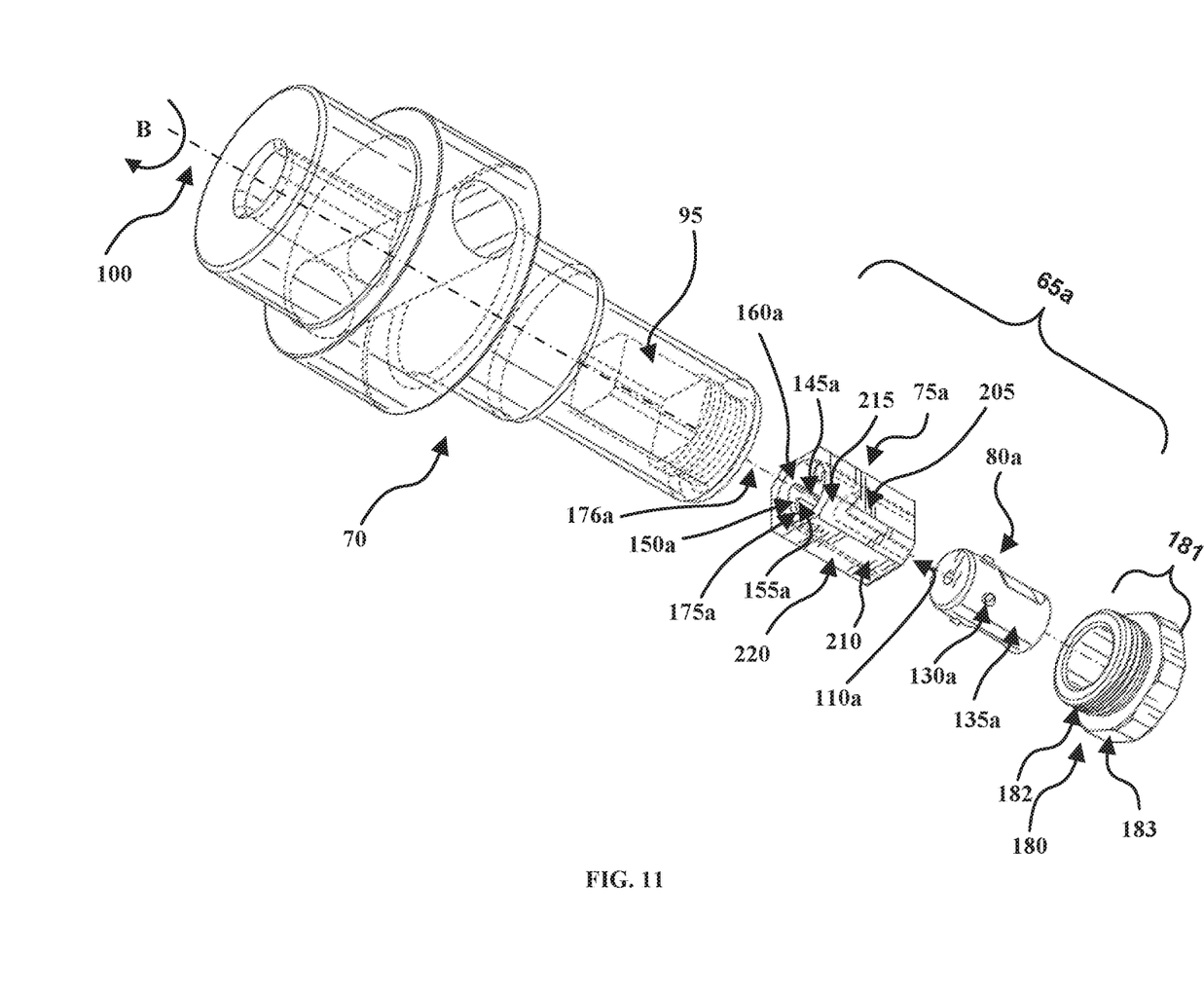
FIG. 11 is an exploded perspective view of the bayonet connector with its associated components in accordance to another embodiment of the present application.
Figure 12:
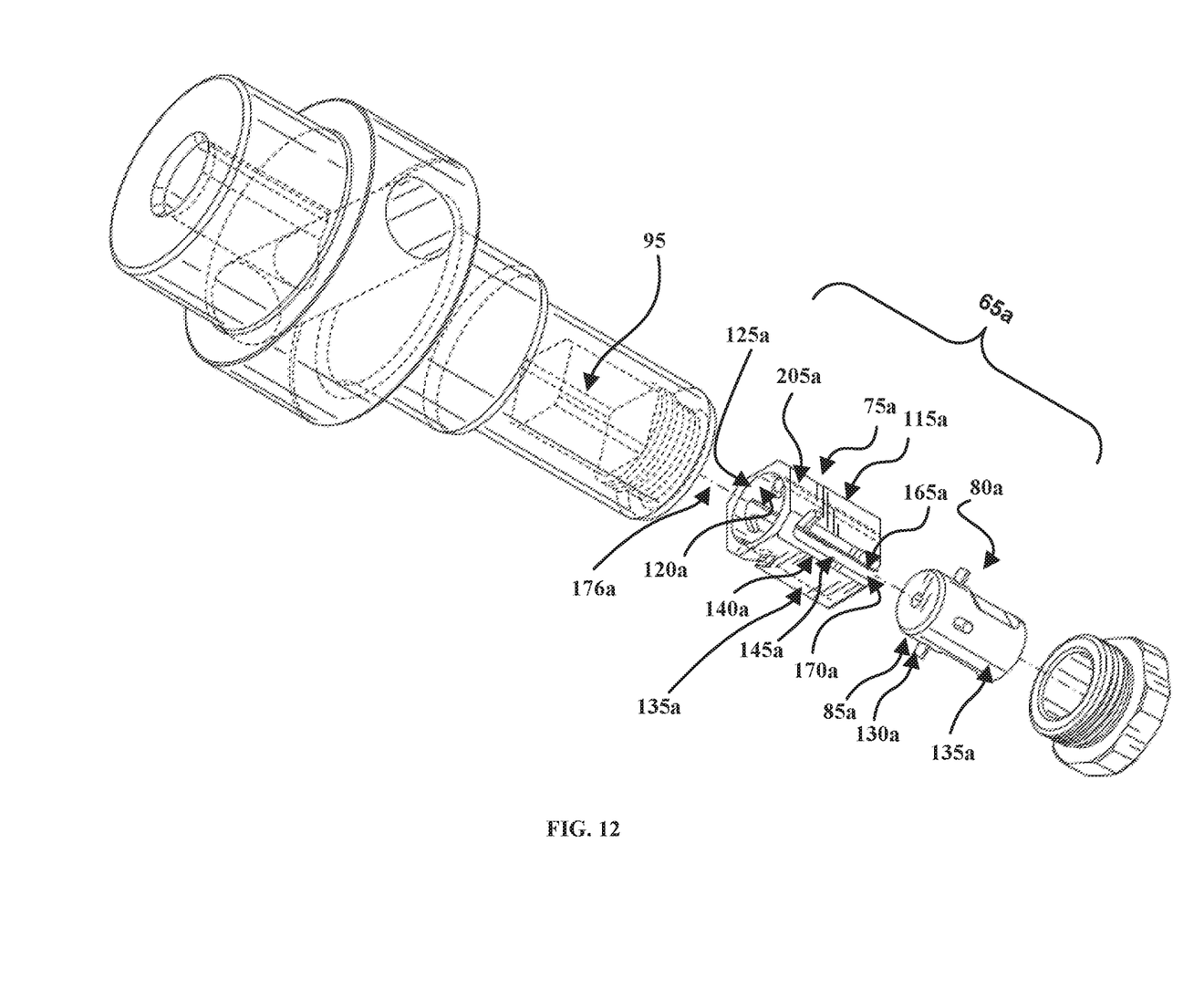
FIG. 12 is an exploded perspective view of the bayonet connector of FIG. 11 with the slots extending through the wall of the receiver from the interior surface completely to the exterior surface.

FIG. 11 and FIG. 12 illustrate another embodiment of bayonet connector 65 generally indicated by 65a. Bayonet connector 65a includes slots 140a in the receiver 75a and lugs 130a on insert 80a rather than the arrangement illustrated by FIG. 5 with slots 140 on insert 80 and lugs 130 in receiver 75. Features common to both embodiments bear the same reference characters. Features of the embodiment illustrated in FIG. 11 and FIG. 12 that are variants of their counterparts of the embodiment of FIG. 5 bear the same reference character as their counterpart except with letter "a" appended to the reference character. Receiver 75a includes an axial opening 110a, and a wall 115a including an interior surface 120a defining a cylindrical space 125a connected to axial opening 110a. Insert 80a includes an exterior surface 135a having lugs 130a, at first end 85a, projecting radially away from exterior surface 135a. Interior surface 120a includes slots 140a having an axial leg 145a and a circumferential leg 150a. Circumferential leg 150a forming an acute angle 155a with axial leg 145a at a junction 160a. Axial leg 145a includes a third end 165a distal from junction 160a. Third end 165a includes an axial opening 170a to permit lug 130a to enter slot 140a when third end 165a engages lug 130a. Circumferential leg 150a includes a fourth end 175a distal from junction 160a such that, with lug 130a in fourth end 175a, rotating receiver 75a about axis 176a of receiver 75a in an angular direction B (see FIG. 11) rotates insert 80a.

In the embodiment illustrated in FIG. 11, receiver 75a includes an exterior surface 205 including four planar sides 210 and four chamfers 215, each chamfer 215 connecting two interconnected planar sides 210 of the four planar sides 210. In some embodiments (e.g., FIG. 5 and FIG. 11), four lugs 130, 130a and four corresponding slots 140, 140a are used with a lug 130, 130a located at a respective chamfer 215. In some embodiments, lugs 130 are located at a respective chamfer 215.

In the embodiment illustrated in FIG. 12, slots 130a extend from interior surface 120a completely to exterior surface 205a. In the embodiment illustrated in FIG. 11, slots 130a extend only partially into wall 115a from interior surface 120a.

In some embodiments, hollow portion 95 has a square cross-section (see, for example, FIG. 5). In some embodiments, hollow portion 95 has a rounded rectangular cross-section (see, for example, FIG. 13). However, a person of ordinary relevant skills in the art would appreciate that hollow portion 95 can have other cross-sections such as a hexagon, an octagon, or a D-shape.

Figure 13:
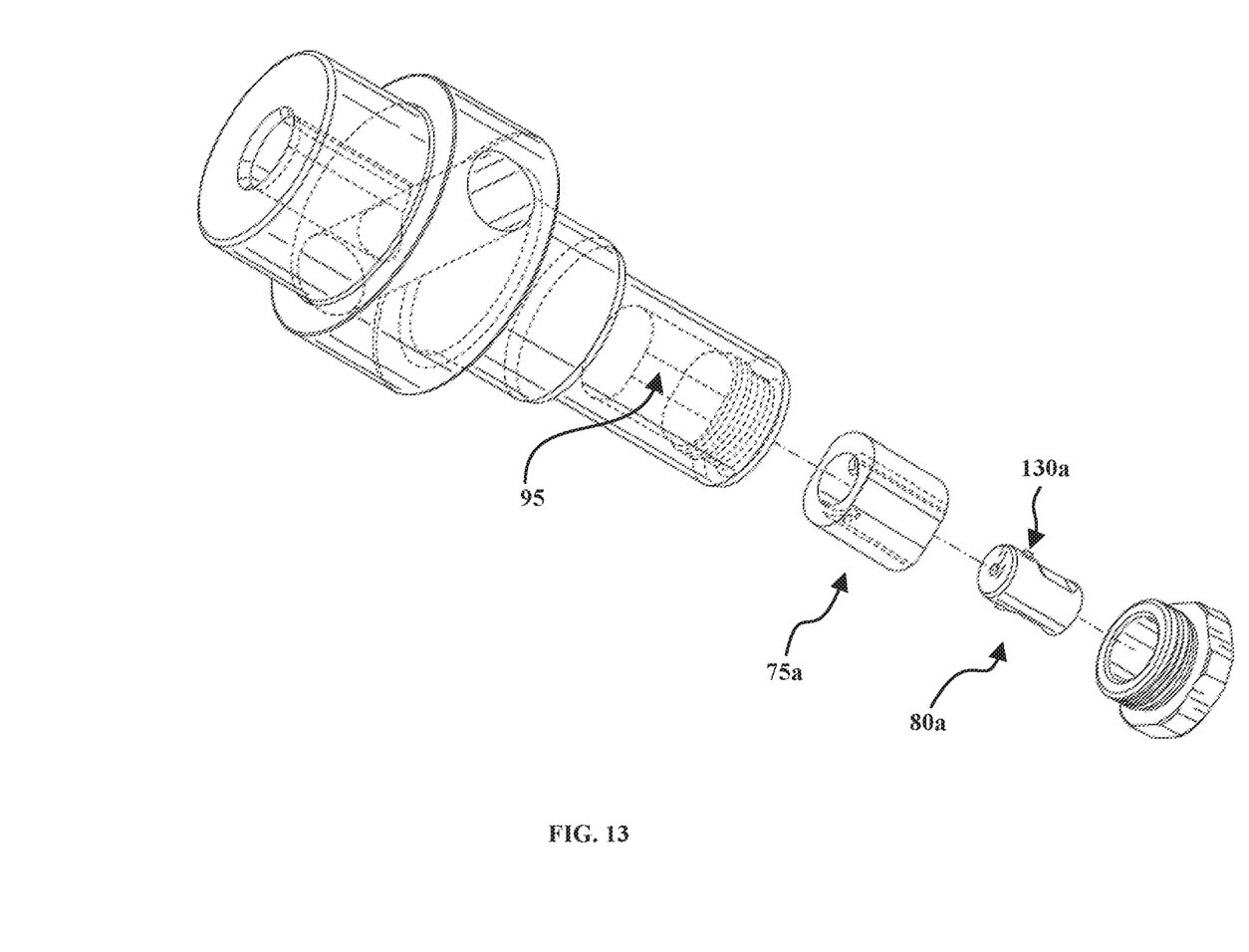
FIG. 13 is an exploded perspective view of the bayonet connector with its associated components in accordance to yet another embodiment of the present application.

In some embodiments, two lugs 130, 130a and two corresponding slots 140, 140a are used (see, for example, FIG. 13).

In prior art apparatuses, the feed screw is threadably connected to the drive shaft of the feed screw motor. Consequently, connecting the feed screw to the drive shaft of the feed screw motor requires rotating the feed screw relative to the drive shaft of the feed screw motor until the desire torque is reached. Many revolutions of the feed screw are required to connect feed screw to or disconnect the feed screw from the drive shaft of the feed screw motor. Rotating the feed screw relative to the drive shaft of the feed screw motor can be cumbersome especially if it is desirable to be able to detach the feed screw from the drive shaft while the feed screw remains within the barrel. With the features taught by the present application, feed screw 37 will only need to be rotated by a fraction of a revolution to connect feed screw 37 to or disconnect feed screw 37 from drive shaft 70. Connecting feed screw 37 to drive shaft 70 can be effected by inserting receiver 75, 75a into hollow portion 95; inserting insert 80, 80a (connected to feed screw 37) into receiver 75, 75a by engaging lugs 130, 130a with respective slots 140, 140a; rotating insert 80, 80a in the angular direction to seat lugs 130, 130a in fourth ends 175, 175a; and tightening collet 180 to drive shaft 70 to prevent axial displacement of receiver 75, 75a relative to hollow portion 95.

While various embodiments according to the present application have been described above, it should be understood that they have been presented by way of illustration and example only, and not limitation. It will be apparent to persons of ordinary relevant skill in the relevant art that various changes in form and detail can be made therein without departing from the scope of the invention. It will also be understood that each feature of each embodiment discussed herein, may be used in combination with the features of any other embodiment. Thus, the breadth and scope of the present invention should not be limited by the above-described exemplary embodiments, but should be defined only in accordance with the appended claims and their equivalents.

What is claimed is:

1. An injector for injecting moldable liquid comprising:
a barrel;
a feed screw concentrically located in the barrel; and
a motor having a drive shaft removably coupled to the feed screw via a bayonet connector,
wherein
the bayonet connector includes a receiver, and an insert including a first end and a second end distal from the first end, the first end removably coupled to and housed in the receiver, the second end coupled to the feed screw,
the drive shaft of the motor includes a hollow portion having a non-round cross-section, the receiver shaped for a snug fit and housed in the hollow portion of the drive shaft such that rotating the drive shaft about an axis of the drive shaft rotates the receiver,
the receiver of the bayonet connector includes an axial opening, and a wall including an interior surface defining a cylindrical space connected to the axial opening, the wall including at least one lug projecting from the interior surface into the cylindrical space, distal from the axial opening, and
the insert of the bayonet connector includes an exterior surface, and at least one slot on the exterior surface at the first end, the at least one slot having an axial leg and a circumferential leg, the circumferential leg forming an acute angle with the axial leg at a junction, the axial leg including a third end distal from the junction, the third end including an axial opening to permit the at least one lug to enter the at least one slot when the third end engages the at least one lug, the circumferential leg including a fourth end distal from the junction such that rotating the receiver of the bayonet connector about an axis of the receiver in an angular direction to seat the at least one lug in the fourth end rotates the insert of the bayonet connector.

2. An injector for injecting moldable liquid comprising:
a barrel;
a feed screw concentrically located in the barrel; and
a motor having a drive shaft removably coupled to the feed screw via a bayonet connector,
wherein
the bayonet connector includes a receiver, and an insert including a first end and a second end distal from the first end, the first end removably coupled to and housed in the receiver, the second end coupled to the feed screw,
the drive shaft of the motor includes a hollow portion having a non-round cross-section, the receiver of the bayonet connector shaped for a snug fit and housed in the hollow portion of the drive shaft such that rotating the drive shaft about an axis of the drive shaft rotates the receiver,
the receiver of the bayonet connector includes an axial opening, and a wall including an interior surface defining a cylindrical space connected to the axial opening, and
the insert of the bayonet connector includes an exterior surface having at least one lug, at the first end, projecting radially away from the exterior surface, the interior surface including at least one slot having an axial leg and a circumferential leg, the circumferential leg forming an acute angle with the axial leg at a junction, the axial leg including a third end distal from the junction, the third end including an axial opening to permit the at least one lug to enter the at least one slot when the third end engages the at least one lug, the circumferential leg including a fourth end distal from the junction such that rotating the receiver of the bayonet connector about an axis of the receiver in an angular direction to seat the at least one lug in the fourth end rotates the insert of the bayonet connector.

3. The injector of claim 1 or claim 2, further comprising a collet, the drive shaft including an axial opening connected to the hollow portion, the collet threadably connected to the axial opening of the drive shaft to inhibit axial displacement of the receiver within the hollow portion thereby inhibiting the at least one lug from moving away from the fourth end.

4. The injector of claim 3, wherein the axial opening is a first axial opening and the receiver includes a second axial opening, distal from the first axial opening of the receiver, connected to the cylindrical space, the first end of the insert extends through the receiver passing through both the first and second axial openings of the receiver.

5. The injector of claim 4, wherein the at least one lug includes more than one lug and the at least one slot includes more than one slot, each slot engaging a respective one of the more than one lug.

6. The injector of claim 5, wherein the insert is threadably connected to the feed screw.

7. The injector of claim 6, wherein the exterior surface of the insert includes two radially spaced apart planar portions.

8. The injector of claim 1, wherein the wall includes an exterior surface including four planar sides and four chamfers, each chamfer connecting two interconnected planar sides of the four planar sides, the at least one lug includes four lugs and the at least one slot includes four slots, each lug located at a respective chamfer.

9. The injector of claim 2, wherein the receiver includes an exterior surface including four planar sides and four chamfers, each chamfer connecting two interconnected planar sides of the four planar sides, the at least one lug includes four lugs and the at least one slot includes four slots, each axial leg located at a respective chamfer.

10. The injector of claim 9, wherein the at least one slot extends from the interior surface of the receiver completely to the exterior surface of receiver.

11. The injector of claim 1 or claim 2, wherein the hollow portion has a rounded rectangular cross-section.

12. The injector of claim 1 or claim 2, wherein the hollow portion has a hexagonal cross-section.

13. The injector of claim 1 or claim 2, wherein the hollow portion has a D-shaped cross-section.

14. The injector of claim 1, wherein the hollow portion has a square cross-section.

15. The injector of claim 2, wherein the hollow portion has a square cross-section.

* * * * *